United States Patent
Hall et al.

(10) Patent No.: US 9,013,076 B2
(45) Date of Patent: Apr. 21, 2015

(54) SYSTEMS AND METHODS FOR COOLING A DRIVE END BEARING

(71) Applicant: Prestolite Electric Inc., Plymouth, MI (US)

(72) Inventors: Robert D. Hall, Berkey, OH (US); Michael J. Hanchett, Lapeer, MI (US); Andrew Cawse, Jukskei Park - Randburg (ZA)

(73) Assignee: Prestolite Electric Inc., Plymouth, MI (US)

( * ) Notice: Subject to any disclaimer, the term of this patent is extended or adjusted under 35 U.S.C. 154(b) by 213 days.

(21) Appl. No.: 13/648,389

(22) Filed: Oct. 10, 2012

(65) Prior Publication Data

US 2014/0097715 A1 Apr. 10, 2014

(51) Int. Cl.
*H02K 9/06* (2006.01)
*H02K 5/18* (2006.01)
*H02K 5/173* (2006.01)

(52) U.S. Cl.
CPC .. *H02K 9/06* (2013.01); *H02K 5/18* (2013.01); *H02K 5/1732* (2013.01)

(58) Field of Classification Search
CPC ............. H02K 9/06; H02K 9/04; H02K 9/02

USPC ........................ 310/59, 62, 58, 52, 60 R, 63
See application file for complete search history.

(56) References Cited

U.S. PATENT DOCUMENTS

| 3,643,119 | A | * | 2/1972 | Lukens ........................ 310/60 R |
| 3,733,150 | A | * | 5/1973 | Porter et al. ................ 417/424.1 |
| 5,214,325 | A | * | 5/1993 | Matson et al. ................... 310/58 |
| 2011/0006622 | A1 | * | 1/2011 | Weiss et al. ..................... 310/62 |
| 2014/0097715 | A1 | * | 4/2014 | Hall et al. ........................ 310/59 |

* cited by examiner

*Primary Examiner* — Michael Andrews
(74) *Attorney, Agent, or Firm* — McAndrews, Held & Malloy, Ltd.

(57) ABSTRACT

Certain embodiments provide systems and methods for cooling a drive end bearing. The system may include an alternator including a drive end bearing, a drive end fan and a front housing face. The drive end fan may include a shaft aperture and auxiliary air flow inlet apertures positioned circumferentially around the shaft aperture. The front housing face may include auxiliary fins coupled to the drive end bearing. The auxiliary fins may protrude from the front housing face. The auxiliary fins may be arrayed axially on the front housing face. In various embodiments, the drive end fan is rotated to draw air through the auxiliary air flow inlet apertures and adjacent to at least a portion of auxiliary fins of the front housing face. The at least a portion of the auxiliary fins transfers heat from the drive end bearing to the air.

18 Claims, 8 Drawing Sheets

SYSTEMS AND METHODS FOR COOLING A DRIVE END BEARING

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to systems and methods for cooling a drive end bearing in an alternator. More specifically, certain embodiments provide a drive end fan comprising auxiliary air flow inlet apertures for drawing ambient temperature air into the drive end fan and radially outward along auxiliary bearing cooling system air paths adjacent to auxiliary fins of a front housing face such that the auxiliary fins transfer drive end bearing heat to the air flow, which cools the drive end bearing.

BACKGROUND OF THE INVENTION

Figure 1:
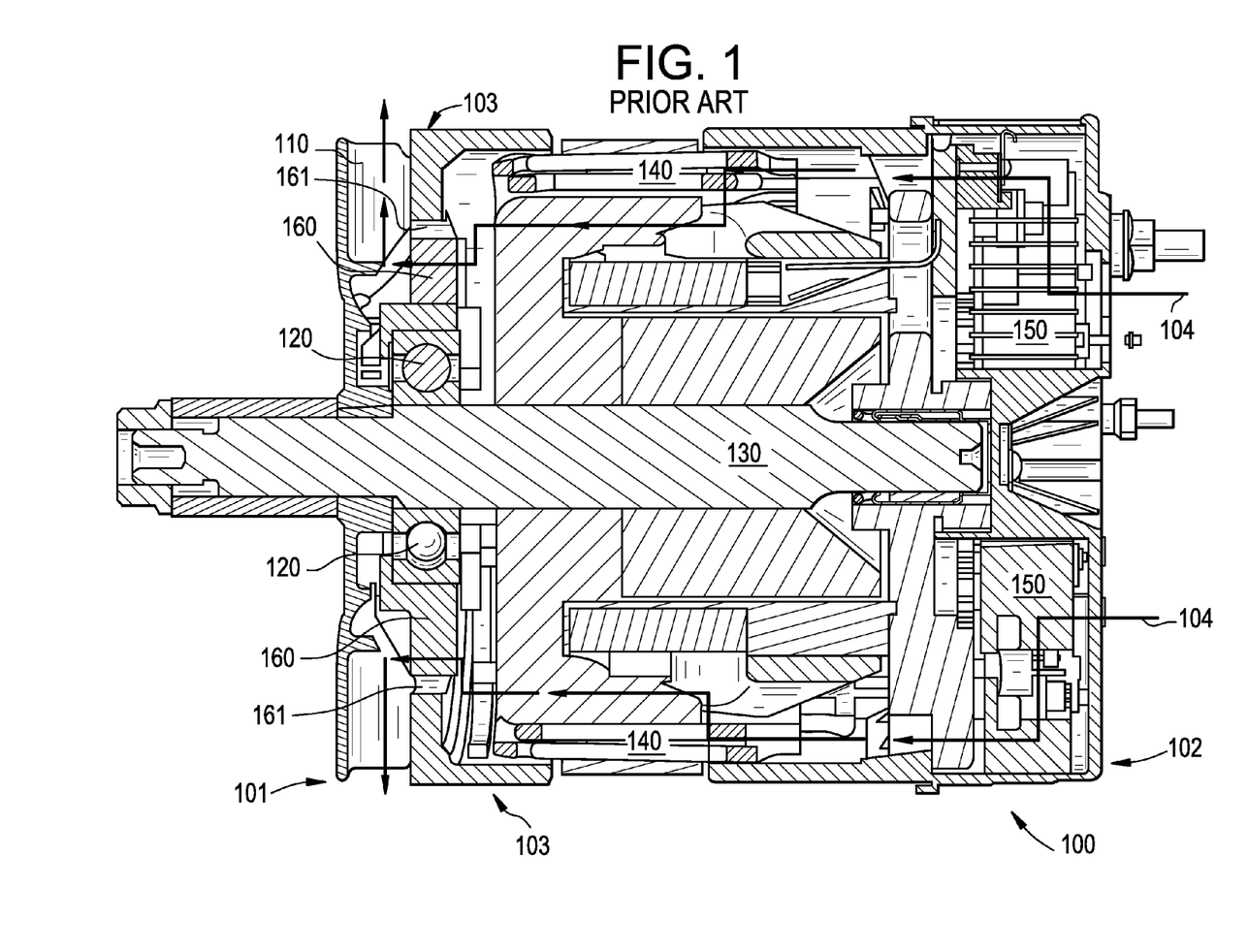
FIG. 1 is a vertical cross-sectional view, taken along the longitudinal axis of a rotor assembly shaft, of an exemplary alternator as is known in the art.

Alternators are electromechanical devices that convert mechanical energy to alternating current. FIG. 1 is a vertical cross-sectional view, taken along the longitudinal axis of a rotor assembly shaft 130, of an exemplary alternator 100 as is known in the art. Referring to FIG. 1, the exemplary alternator 100 may comprise, as an example, a drive end 101, a rear end 102, sides 103, conventional main air flow paths 104, a drive end fan 110, a drive end bearing 120, a rotor assembly shaft 130, stator windings 140, rectifiers 150, and a front housing face 160, among other things. The front housing face 160 may comprise conventional fins 161, for example.

The rotor assembly shaft 130 may be connected with, for instance, a pulley, not shown, that may be driven by the engine of a motor vehicle, also not shown. The drive end fan 110 may be mounted on the shaft 130, for rotation with the shaft 130, at the drive end 101. Rotation of the drive end fan 110 pulls air through the alternator 100 along the conventional main air flow paths 104 for cooling the components of the alternator 100. Ambient temperature air enters the alternator 100 at the rear end 102 and is expelled from the sides 103 at the drive end 101 of the alternator 100 by the drive end fan 110.

More specifically, the air entering the alternator 100 at the rear end 102 flows adjacent to the rectifiers 150, the stator windings 140 and the drive end bearing 120 along the conventional main air flow paths 104. As the ambient temperature air is pulled adjacent to the rectifiers 150, heat from the rectifiers is transferred to the air flow, which cools the rectifiers 150. The rectifier-warmed air flow may then be pulled adjacent to the stator windings 140, where additional heat is transferred to the air flow, thereby cooling the stator windings 140. The stator winding and rectifier-warmed air flow may then be pulled adjacent to the drive end bearing 120, where additional heat is transferred to the air flow via conventional fins 161 of a front housing face 160. The drive end bearing, stator winding and rectifier-warmed air flow may then be expelled from the sides 103 at the drive end 101 of the alternator 100 by the drive end fan 110.

Current conventional main air flow paths 104 in alternators 100 have limited effectiveness cooling the drive end bearing 120 due to the air flowing over the conventional fins 105 being pre-heated by the rectifiers 150 and stator windings 140. The ineffective cooling of the drive end bearing 120 reduces the life of the drive end bearing 120.

As such, there is a need for providing improved systems and methods for cooling a drive end bearing 120 in an alternator 100.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Systems and methods for cooling a drive end bearing in an alternator are provided, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

The foregoing summary, as well as the following detailed description of certain embodiments of the present invention, may be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Certain embodiments of the invention may be found in systems and methods for cooling a drive end bearing 120 in an alternator 100. More specifically, certain embodiments provide a drive end fan 110 comprising auxiliary air flow inlet apertures 114 for drawing ambient temperature air into the drive end fan 110 and radially outward along auxiliary bearing cooling system air paths 105 adjacent to auxiliary fins 162 of a front housing face 160 such that the auxiliary fins 162 transfer drive end bearing heat to the air flow, which cools the drive end bearing 120.

Various embodiments provide an alternator 100 comprising a drive end bearing 120, a drive end fan 110 and a front housing face 160. The drive end fan 110 may comprise a shaft aperture 112 and a plurality of auxiliary air flow inlet apertures 114 positioned circumferentially around the shaft aperture 112. The front housing face may comprise a plurality of auxiliary fins 162 coupled to the drive end bearing 120. The plurality of auxiliary fins 162 may protrude from the front housing face 160. The plurality of auxiliary fins 162 may be arrayed axially on the front housing face 160.

Figure 8:
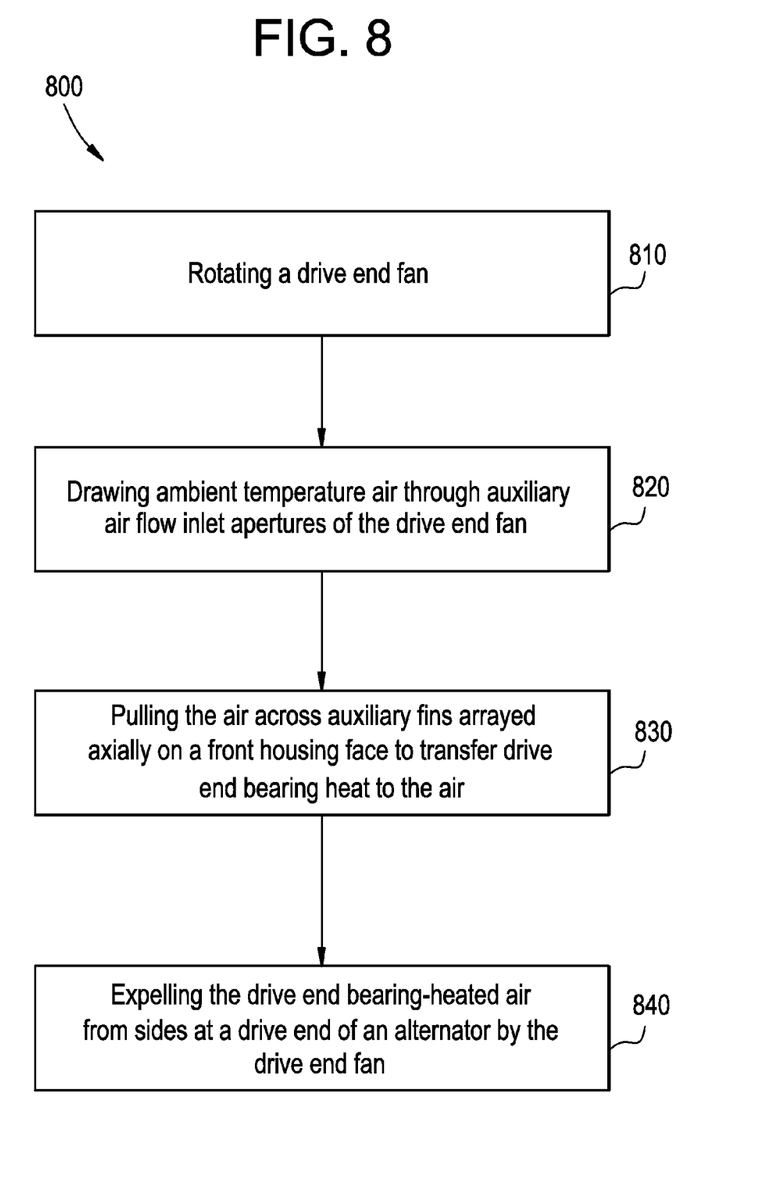
FIG. 8 is a flow diagram that illustrates exemplary steps for cooling a drive end bearing in accordance with an embodiment of the present invention.

Certain embodiments provide a method 800 for cooling a drive end bearing 120. The method 800 may comprise rotating 810 a drive end fan 110. The method 800 may comprise drawing 820 air through a plurality of auxiliary air flow inlet apertures 114 of the drive end fan 110. The method 800 may comprise pulling 830 the air across a plurality of auxiliary fins 162 arrayed axially on a front housing face 160 to transfer drive end bearing heat to the air. The method 800 may comprise expelling 840 the drive end bearing-heated air from an alternator 100 by the drive end fan 110.

Figure 2:
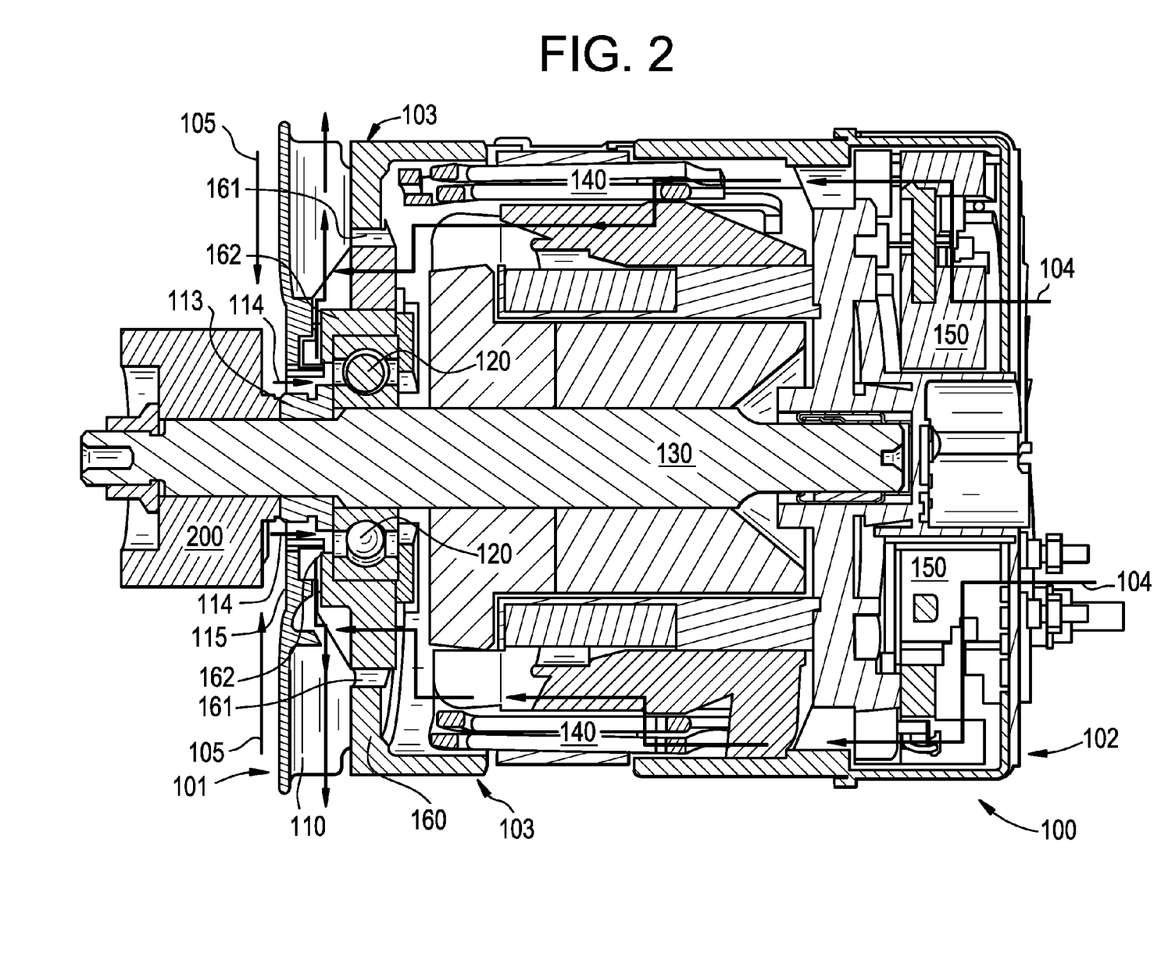
FIG. 2 is a vertical cross-sectional view, taken along the longitudinal axis of a rotor assembly shaft, of an exemplary alternator comprising an auxiliary bearing cooling system air path in accordance with an embodiment of the present invention.

Although certain embodiments in the foregoing description may be shown with brushless alternators as illustrated in FIGS. 1-2, for example, unless so claimed, the scope of various aspects of the present invention should not be limited to brushless alternators and may additionally and/or alternatively be applicable to brush-type alternators, or any suitable alternator.

FIG. 2 is a vertical cross-sectional view, taken along the longitudinal axis of a rotor assembly shaft 130, of an exemplary alternator 100 comprising an auxiliary bearing cooling system air path 105 in accordance with an embodiment of the present invention. Referring to FIG. 2, the exemplary alternator 100 may comprise, as an example, a drive end 101, a rear end 102, sides 103, conventional main air flow paths 104, auxiliary bearing cooling system air paths 105, a drive end fan 110, a drive end bearing 120, a rotor assembly shaft 130, stator windings 140, rectifiers 150, and a front housing face 160, among other things. The drive end fan 110 may comprise fan blades 111, a shaft aperture 112, a fan hub 113, auxiliary air flow inlet apertures 114, a fan face depression 115 and/or fan face slots 116, for example. The front housing face 160 may comprise conventional fins 161 and auxiliary fins 162, for example.

The rotor assembly shaft 130 may be connected with, for instance, a pulley 200 that may be driven by the engine of a motor vehicle, not shown. The drive end fan 110 may be mounted on the shaft 130, for rotation with the shaft 130, at the drive end 101.

Figure 3:
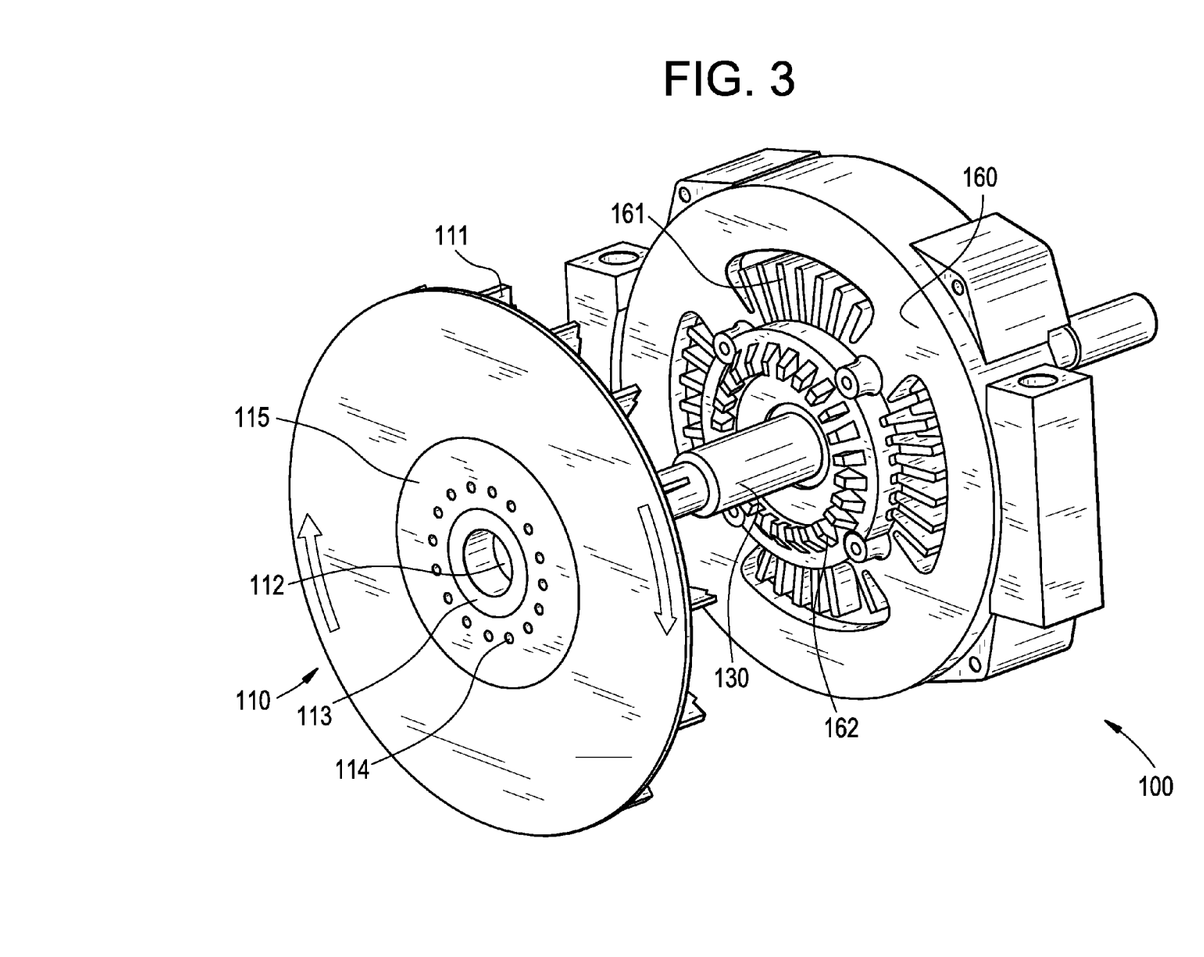
FIG. 3 is a partially exploded perspective view of an exemplary drive end fan and front housing face of an exemplary alternator in accordance with an embodiment of the present invention.
Figure 5:
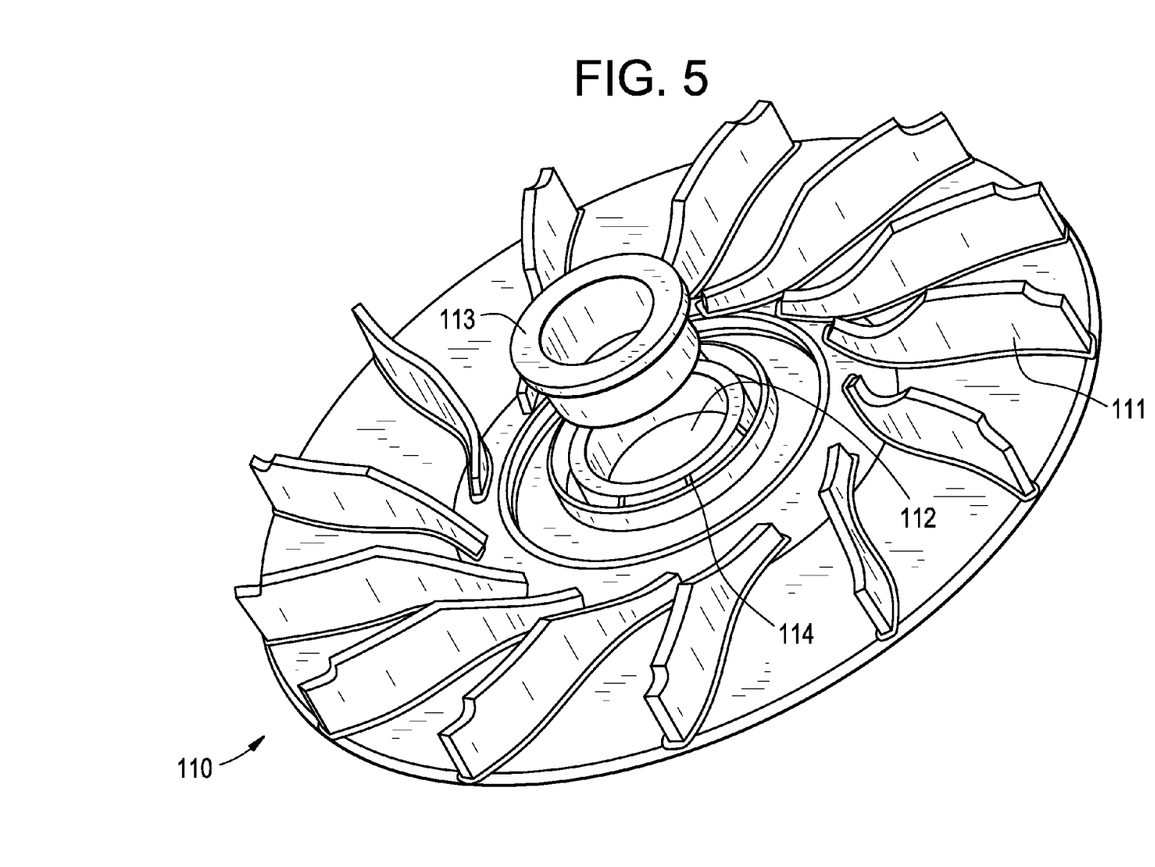
FIG. 5 is a rear perspective view of an exemplary drive end fan in accordance with an embodiment of the present invention.
Figure 6:
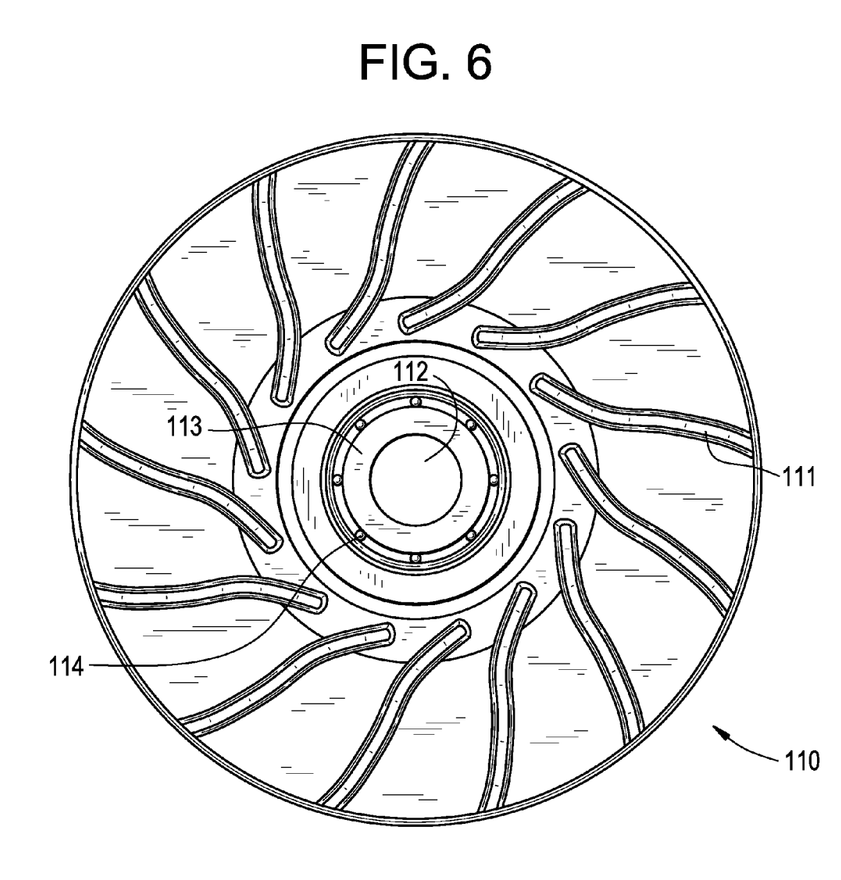
FIG. 6 is a rear end elevational view of an exemplary drive end fan in accordance with an embodiment of the present invention.
Figure 7:
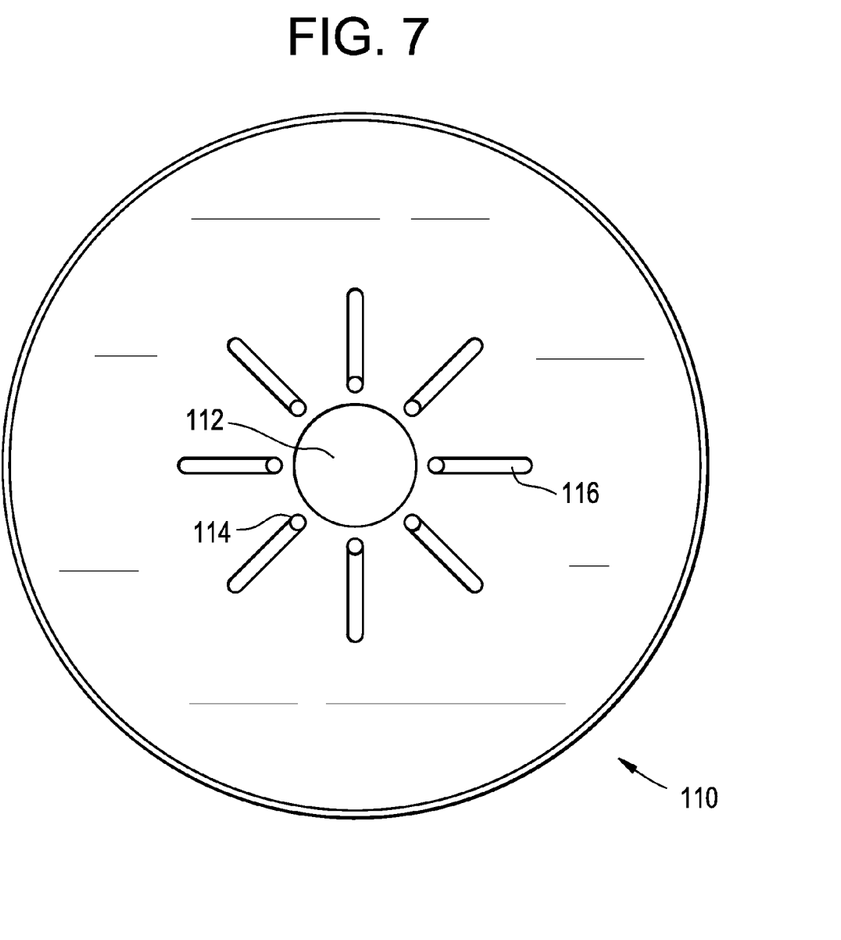
FIG. 7 is a front end elevational view of an exemplary drive end fan in accordance with an embodiment of the present invention.

Certain embodiments provide the drive end fan 110 comprises fan blades 111 (as illustrated in FIGS. 3 and 5-6, for example), a shaft aperture 112 (as illustrated in FIGS. 3 and 5-7, for example), a fan hub 113, auxiliary air flow inlet apertures 114, a fan face depression 115 and/or fan face slots 116 (as illustrated in FIG. 7, for example), among other things. The drive end fan 110 may be aluminum, plastic, steel, or any suitable material. The shaft aperture 112 extends through the drive end fan 110. The shaft aperture 112 is positioned substantially at the center of the drive end fan 110 and is configured to receive one or more of the fan hub 113 and the rotor assembly shaft 130.

In various embodiments, a fan hub 113 is integrated with the drive end fan 110 at the shaft aperture 112 or operable to fit within the shaft aperture 112. In certain embodiments, the fan hub 113 may be manufactured using substantially the same material as the rotor assembly shaft 130 such that the thermal expansion properties of the rotor assembly shaft 130 and the fan hub 130 are substantially matched. For example, in certain embodiments, the fan hub 130 and the rotor assembly shaft 130 may be steel, or any suitable material. In various embodiments, the fan hub 113 and the rotor assembly may be manufactured using different materials. In certain embodiments, the fan hub 113 may be omitted and the rotor assembly shaft 130 can be attached to the drive end fan 110 within the shaft aperture 112.

In certain embodiments, the fan blades 111 may be positioned toward the center of the drive end fan 100 and extend radially outward (as illustrated in FIGS. 5-6, for example). Various embodiments provide that when the drive end fan 110 is rotating, air pressure levels increase from the center of the drive end fan 110 radially outward to the sides 103 of alternator 100.

The drive end fan 110 may comprise auxiliary air flow inlet apertures 114 that extend through the drive end fan 110. The auxiliary air flow inlet apertures 114 can be positioned circumferentially around the shaft aperture 112 and/or the fan hub 113. In certain embodiments, the auxiliary air flow inlet apertures 114 may be substantially the same size and evenly spaced about the shaft aperture 112 and/or the fan hub 113; however, auxiliary air flow inlet apertures 114 of different sizes and spacing are also contemplated. In various embodiments, sixteen auxiliary air flow inlet apertures 114 (as illustrated in FIG. 3, for example) may be included in the drive end fan 110; however, more or less auxiliary air flow inlet apertures 114 are also contemplated (as illustrated in FIGS. 2 and 6-7, for example).

In various embodiments, rotation of the drive end fan 110 pulls air through the auxiliary air flow inlet apertures 114 and adjacent to the front housing face 160 along the auxiliary bearing cooling system air paths 105 for cooling the drive end bearing 120 via the auxiliary fins 162. For example, the drive end bearing 120 may be coupled to auxiliary fins 162 in such a way that heat from the drive end bearing 120 is transferred to the auxiliary fins 162. As such, by transferring heat from the auxiliary fins 162 to the air, the temperature of the drive end bearing 120 coupled to the auxiliary fins 162 is decreased.

More specifically, rotation of the drive end fan 110 pulls ambient temperature air behind a pulley 200, for example, and through the auxiliary air flow inlet apertures 114 into an otherwise stagnant air pocket in front of the drive end bearing 120. The fan face depression 115 may be positioned around the shaft aperture 112 of the drive end fan 110 and provide an opening for air to flow behind a pulley 200 and through the auxiliary air flow inlet apertures 114 as the drive end fan 110 is rotating. The lower air pressure at the auxiliary air flow inlet apertures 114 allows the drive end fan 110 to draw the air radially outward past auxiliary fins 162 arrayed axially on the front housing face 160. The auxiliary fins 162 transfer drive end bearing heat to the auxiliary bearing cooling system air flow, thereby cooling the drive end bearing 120. The auxiliary bearing cooling system air flow may then be expelled from the sides 103 at the drive end 101 of the alternator 100 by the drive end fan 110.

In certain embodiments, rotation of the drive end fan 110 pulls air through the alternator 100 along the conventional main air flow paths 104 for cooling the components of the alternator 100. Ambient temperature air enters the alternator 100 at the rear end 102 and is expelled from the sides 103 at the drive end 101 of the alternator 100 by the drive end fan 110.

More specifically, the air entering the alternator 100 at the rear end 102 flows adjacent to the rectifiers 150, the stator windings 140 and the drive end bearing 120 along the conventional main air flow paths 104. As the ambient temperature air is pulled adjacent to the rectifiers 150, heat from the rectifiers is transferred to the air flow, which cools the rectifiers 150. The rectifier-warmed air flow may then be pulled adjacent to the stator windings 140, where additional heat is transferred to the air flow, thereby cooling the stator windings 140. The stator winding and rectifier-warmed air flow may then be pulled adjacent to the drive end bearing 120, where additional heat is transferred to the air flow via conventional fins 161 of a front housing face 160. The drive end bearing, stator winding and rectifier-warmed air flow may then be expelled from the sides 103 at the drive end 101 of the alternator 100 by the drive end fan 110.

In various embodiments, air pulled along the auxiliary bearing cooling system air paths 105 may join air from the conventional main air flow paths 104 at the drive end fan 110 prior to being expelled from the sides 103 at the drive end 101 of the alternator 100 by the drive end fan 110.

FIG. 3 is a partially exploded perspective view of an exemplary drive end fan 110 and front housing face 160 of an exemplary alternator 100 in accordance with an embodiment of the present invention. Referring to FIG. 3, the drive end fan 110 comprises fan blades 111, a shaft aperture 112, a fan hub 113, auxiliary air flow inlet apertures 114, and a fan face depression 115, for example.

The front housing face 160 may comprise conventional fins 161 and auxiliary fins 162, for example. In various embodiments, the conventional fins 161 may be cut into the front housing face 160 such that the conventional main air flow is pulled through the front housing face 160 between the conventional fins 161 by the drive end fan 110. The front housing face 160 comprising the conventional fins 161 cut into the front housing face 160 may be manufactured using a die case mold, for example, or any suitable manufacturing method. The air flowing between the conventional fins 161 may provide cooling to the drive end bearing 120, although the cooling may be limited due to the air flowing along the conventional main air flow paths 104 being pre-heated by the rectifiers 150 and stator windings 140.

In certain embodiments, the auxiliary fins 162 may protrude from the front housing face 160 and can be arrayed axially on the front housing face 160. The drive end bearing 120 may be cooled via the auxiliary fins 162 as the drive end fan 110 rotates to pull ambient temperature air through the auxiliary air flow inlet apertures 114 and across the auxiliary fins 162 along the auxiliary bearing cooling system air paths 105. For example, the drive end bearing 120 may be coupled to auxiliary fins 162 in such a way that heat from the drive end bearing 120 is transferred to the auxiliary fins 162. As such, by transferring heat from the auxiliary fins 162 to the air, the temperature of the drive end bearing 120 coupled to the auxiliary fins 162 is decreased.

The drive end fan 110 and the front housing face 160 illustrated in FIG. 3 shares various characteristics with the drive end fan 110 and the front housing face 160 illustrated in FIG. 2 as described above.

Figure 4:
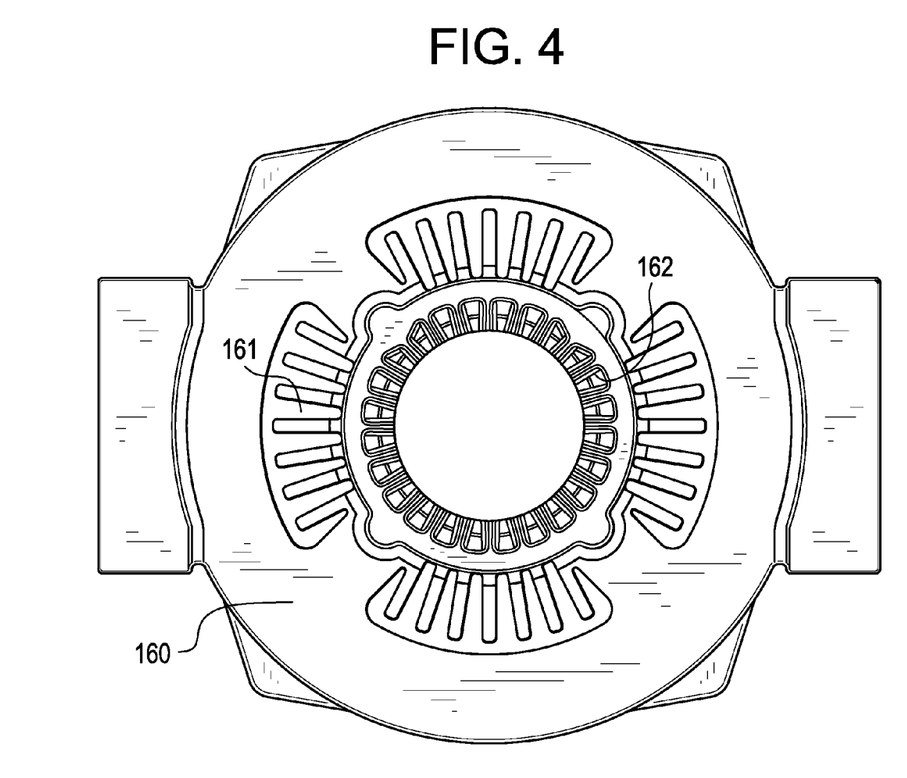
FIG. 4 is a front end elevational view of an exemplary front housing face in accordance with an embodiment of the present invention.

FIG. 4 is a front end elevational view of an exemplary front housing face 160 in accordance with an embodiment of the present invention. Referring to FIG. 4, the front housing face 160 comprises conventional fins 161 and auxiliary fins 162, for example.

The front housing face 160 illustrated in FIG. 4 shares various characteristics with the front housing face 160 illustrated in FIGS. 2-3 as described above.

FIG. 5 is a rear perspective view of an exemplary drive end fan 110 in accordance with an embodiment of the present invention. FIG. 6 is a rear end elevational view of an exemplary drive end fan 110 in accordance with an embodiment of the present invention. Referring to FIGS. 5-6, the drive end fan 110 comprises fan blades 111, a shaft aperture 112, a fan hub 113, and auxiliary air flow inlet apertures 114.

The drive end fan 110 illustrated in FIGS. 5-6 shares various characteristics with the drive end fan 110 illustrated in FIGS. 2-3 as described above.

FIG. 7 is a front end elevational view of an exemplary drive end fan 110 in accordance with an embodiment of the present invention. Referring to FIG. 7, the drive end fan 110 comprises a shaft aperture 112, auxiliary air flow inlet apertures 114, and fan face slots 116, for example. In various embodiments, the fan face slots 116 may be grooves cut into, but not through, the front face of the drive end fan 110 such that an opening is provided for air to flow behind a pulley 200 and through the auxiliary air flow inlet apertures 114 as a drive end fan 110 is rotating. For example, certain pulley types may be positioned substantially flush to the front face of the drive end fan 110. As such, in order for ambient temperature air to access the auxiliary air flow inlet apertures 114 when a flush mounted pulley is used, certain embodiments provide fan face slots 116 as illustrated in FIG. 7 and/or a fan face depression 115 as illustrated in FIGS. 2-3.

In various embodiments, the fan face slots 116 may be in addition to or an alternative to the fan face depression illustrated in FIGS. 2-3, for example. In certain embodiments, the auxiliary air flow inlet apertures 114 are positioned within the fan face slots 116. In various embodiments, the fan face slots 116 are positioned circumferentially around the shaft aperture 112 and/or the fan hub 113. In certain embodiments, the fan face slots 116 may be substantially the same size, same shape, and evenly spaced about the shaft aperture 112 and/or the fan hub 113; however, fan face slots 116 of different sizes, shapes and spacing are also contemplated. In various embodiments, the number of fan face slots 116 corresponds with the number of auxiliary air flow inlet apertures 114. In certain embodiments, eight fan face slots 116 may be included in the drive end fan 110; however, more or less fan face slots 116 are also contemplated.

The drive end fan 110 illustrated in FIG. 7 shares various characteristics with the drive end fan 110 illustrated in FIGS. 2-3 and 5-6 as described above.

FIG. 8 is a flow diagram 800 that illustrates exemplary steps 810-840 for cooling a drive end bearing 120 in accordance with an embodiment of the present invention. Referring to FIG. 8, there is shown a flow diagram 800, which illustrates exemplary steps 810-840 for cooling a drive end bearing 120. At step 810, a drive end fan 110 is rotated. At step 820, ambient temperature air is drawn through auxiliary air flow inlet apertures 114 of the drive end fan 110. At step 830, the air is pulled across auxiliary fins 162 arrayed axially on a front housing face 160 to transfer drive end bearing heat to the air. At step 840, the drive end bearing-heated air is expelled from sides 103 at a drive end 101 of an alternator 100 by the drive end fan 110. Although the method is described with reference to the exemplary elements of the systems described above, it should be understood that other implementations are possible.

At step 810, a drive end fan 110 is rotated. In certain embodiments, the drive end fan 110 is positioned at a drive end 101 of an alternator 100 and is connected to a rotor assembly shaft 130 of the alternator 100, for rotation with the shaft 130. The rotor assembly shaft 130 may be connected with, for instance, a pulley 200 that may be driven by the engine of a motor vehicle, not shown, for example.

At step 820, ambient temperature air is drawn through auxiliary air flow inlet apertures 114 of the drive end fan 110. In various embodiments, rotation of the drive end fan 110 pulls ambient temperature air behind a pulley 200, for example, and through the auxiliary air flow inlet apertures 114 into an otherwise stagnant air pocket in front of the drive end bearing 120. A fan face depression 115 or fan face slots 116 may provide an opening for air to flow behind a pulley 200 and through the auxiliary air flow inlet apertures 114 as a drive end fan 110 is rotating. For example, certain pulley types may be positioned substantially flush to the front face of the drive end fan 110. As such, in order for ambient temperature air to access the auxiliary air flow inlet apertures 114 when a flush mounted pulley is used, certain embodiments provide fan face slots 116 as illustrated in FIG. 7 and/or a fan face depression 115 as illustrated in FIGS. 2-3.

At step 830, the air is pulled across auxiliary fins 162 arrayed axially on a front housing face 160 to transfer drive end bearing heat to the air. Various embodiments provide that when the drive end fan 110 is rotating, air pressure levels increase from the center of the drive end fan 110 radially outward to the sides 103 of the alternator 100. The lower air pressure at the auxiliary air flow inlet apertures 114 allows the drive end fan 110 to draw the air radially outward past auxiliary fins 162. In certain embodiments, the auxiliary fins 162 may protrude from the front housing face 160 and can be arrayed axially on the front housing face 160. The drive end bearing 120 may be cooled via the auxiliary fins 162 as the drive end fan 110 rotates to pull ambient temperature air through the auxiliary air flow inlet apertures 114 and across the auxiliary fins 162 along the auxiliary bearing cooling system air paths 105.

At step 840, the drive end bearing-heated air is expelled from sides 103 at a drive end 101 of an alternator 100 by the drive end fan 110. In various embodiments, air pulled along the auxiliary bearing cooling system air paths 105 may join air from conventional main air flow paths 104 at the drive end fan 110 prior to being expelled from the sides 103 at the drive end 101 of the alternator 100 by the drive end fan 110.

Various embodiments provide an alternator 100 comprising a drive end bearing 120, a drive end fan 110 and a front housing face 160. The drive end fan 110 may comprise a shaft aperture 112 and a plurality of auxiliary air flow inlet apertures 114 positioned circumferentially around the shaft aperture 112. The front housing face may comprise a plurality of auxiliary fins 162 coupled to the drive end bearing 120. The plurality of auxiliary fins 162 may protrude from the front housing face 160. The plurality of auxiliary fins 162 may be arrayed axially on the front housing face 160.

In certain embodiments, the drive end fan 110 is rotated to draw air through the plurality of auxiliary air flow inlet apertures 114 and adjacent to at least a portion of the plurality of auxiliary fins 162 of the front housing face 160.

In various embodiments, the air drawn through the plurality of auxiliary air flow inlet apertures 114 is ambient temperature air.

In certain embodiments, the at least a portion of the plurality of auxiliary fins 162 transfers heat from the drive end bearing 120 to the air.

In various embodiments, each of the plurality of auxiliary air flow inlet apertures 114 is substantially a same size.

In certain embodiments, each of the plurality of auxiliary air flow inlet apertures 114 is evenly spaced about the shaft aperture 112.

In various embodiments, the plurality of auxiliary air flow inlet apertures 114 are at least one of eight auxiliary air flow inlet apertures and sixteen auxiliary air flow inlet apertures.

In certain embodiments, the air drawn through the plurality of auxiliary air flow inlet apertures 114 and adjacent to the at least a portion of the plurality of auxiliary fins 162 of the front housing face 160 is expelled from the alternator 100 by the drive end fan 110.

In various embodiments, the alternator 100 comprises a rear end 102. The air from the rear end 102 is drawn through the alternator 100 and joins the air drawn through the plurality of auxiliary air flow inlet apertures 114 prior to being expelled from the alternator 100 by the drive end fan 110.

In certain embodiments, the drive end fan 110 comprises a front face (FIGS. 3 and 7) and a rear face (FIGS. 5-6). The front face (FIGS. 3 and 7) comprises a plurality of fan face slots 116 positioned circumferentially around the shaft aperture 112 (as illustrated in FIG. 7). Each of the plurality of the auxiliary air flow inlet apertures 114 is positioned within a corresponding one of the plurality of fan face slots 116.

In various embodiments, the drive end fan 110 comprises a front face (FIGS. 3 and 7) and a rear face (FIGS. 5-6). The front face (FIGS. 3 and 7) comprises a fan face depression 115 positioned around the shaft aperture 112 (as illustrated in FIG. 3). The plurality of auxiliary air flow inlet apertures 114 are positioned within the fan face depression 115.

Certain embodiments provide a method 800 for cooling a drive end bearing 120. The method 800 may comprise rotating 810 a drive end fan 110. The method 800 may comprise drawing 820 air through a plurality of auxiliary air flow inlet apertures 114 of the drive end fan 110. The method 800 may comprise pulling 830 the air across a plurality of auxiliary fins 162 arrayed axially on a front housing face 160 to transfer drive end bearing heat to the air. The method 800 may comprise expelling 840 the drive end bearing-heated air from an alternator 100 by the drive end fan 110.

In various embodiments, the air drawn through the plurality of auxiliary air flow inlet apertures 114 is ambient temperature.

In certain embodiments, the plurality of auxiliary air flow inlet apertures 114 are positioned circumferentially around a shaft aperture 112 of the drive end fan 110.

In various embodiments, each of the plurality of auxiliary air flow inlet apertures 114 is substantially a same size.

In certain embodiments, each of the plurality of auxiliary air flow inlet apertures 114 is evenly spaced about the shaft aperture 112.

In various embodiments, the method 800 may comprise drawing air from a rear end 102 of the alternator 100 through the alternator 100. The air drawn from the rear end 102 of the alternator 100 and through the alternator 100 may join the air drawn through the plurality of auxiliary air flow inlet apertures 114 prior to being expelled from the alternator 100 by the drive end fan 110.

In certain embodiments, the method 800 may comprise drawing the air behind a pulley 200 prior to drawing the air through the plurality of auxiliary air flow inlet apertures 114 of the drive end fan 110.

In various embodiments, the air drawn behind the pulley 200 is drawn through a plurality of fan face slots 116 positioned circumferentially around a shaft aperture 112 of the drive end fan 110. Each of the plurality of the auxiliary air flow inlet apertures 114 may be positioned within a corresponding one of the plurality of fan face slots 116.

In certain embodiments, the air drawn behind the pulley 200 is drawn through a fan face depression 115 positioned around a shaft aperture 112 of the drive end fan 110. The plurality of auxiliary air flow inlet apertures 114 are positioned within the fan face depression 115.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An alternator comprising:
    a drive end bearing;
    a drive end fan comprising a shaft aperture and a plurality of auxiliary air flow inlet apertures positioned circumferentially around the shaft aperture, wherein the drive end fan comprises a front face and a rear face, the front face comprising a plurality of fan face slots positioned circumferentially around the shaft aperture, wherein each of the plurality of the auxiliary air flow inlet apertures is positioned within a corresponding one of the plurality of fan face slots; and
    a front housing face comprising a plurality of auxiliary fins coupled to the drive end bearing, the plurality of auxiliary fins protruding from the front housing face, and the plurality of auxiliary fins arrayed axially on the front housing face.

2. The alternator according to claim 1, wherein the drive end fan is rotated to draw air through the plurality of auxiliary air flow inlet apertures and adjacent to at least a portion of the plurality of auxiliary fins of the front housing face.

3. The alternator according to claim 2, wherein the air drawn through the plurality of auxiliary air flow inlet apertures is ambient temperature air.

4. The alternator according to claim 3, wherein the at least a portion of the plurality of auxiliary fins transfers heat from the drive end bearing to the air.

5. The alternator according to claim 2, wherein the air drawn through the plurality of auxiliary air flow inlet apertures and adjacent to the at least a portion of the plurality of auxiliary fins of the front housing face is expelled from the alternator by the drive end fan.

6. The alternator according to claim 5, comprising a rear end, wherein air from the rear end is drawn through the alternator and joins the air drawn through the plurality of auxiliary air flow inlet apertures prior to being expelled from the alternator by the drive end fan.

7. The alternator according to claim 1, wherein each of the plurality of auxiliary air flow inlet apertures is substantially a same size.

8. The alternator according to claim 1, wherein each of the plurality of auxiliary air flow inlet apertures is evenly spaced about the shaft aperture.

9. The alternator according to claim 1, wherein the plurality of auxiliary air flow inlet apertures are at least one of eight auxiliary air flow inlet apertures and sixteen auxiliary air flow inlet apertures.

10. The alternator according to claim 1, wherein the drive end fan comprises a front face and a rear face, the front face comprising a fan face depression positioned around the shaft aperture, wherein the plurality of auxiliary air flow inlet apertures are positioned within the fan face depression.

11. A method for cooling a drive end bearing, the method comprising:
    rotating a drive end fan of an alternator;
    drawing air through a plurality of auxiliary air flow inlet apertures of the drive end fan, wherein the drive end fan comprises a front face and a rear face, the front face comprising a plurality of fan face slots positioned circumferentially around a shaft aperture, wherein each of the plurality of auxiliary air flow inlet apertures is positioned within a corresponding one of the plurality of fan face slots;
    pulling the air across a plurality of auxiliary fins arrayed axially on a front housing face to transfer drive end bearing heat to the air; and
    expelling the drive end bearing-heated air from the alternator by the drive end fan.

12. The method according to claim 11, wherein the air drawn through the plurality of auxiliary air flow inlet apertures is ambient temperature.

13. The method according to claim 11, wherein each of the plurality of auxiliary air flow inlet apertures is substantially a same size.

14. The method according to claim 11, wherein each of the plurality of auxiliary air flow inlet apertures is evenly spaced about the shaft aperture.

15. The method according to claim 11, comprising drawing air from a rear end of the alternator through the alternator, wherein the air drawn from the rear end of the alternator and through the alternator joins the air drawn through the plurality of auxiliary air flow inlet apertures prior to being expelled from the alternator by the drive end fan.

16. The method according to claim 11, comprising drawing the air behind a pulley prior to drawing the air through the plurality of auxiliary air flow inlet apertures of the drive end fan.

17. The method according to claim 16, wherein the air drawn behind the pulley is drawn through the plurality of fan face slots positioned circumferentially around the shaft aperture of the drive end fan.

18. The method according to claim 16, wherein the air drawn behind the pulley is drawn through a fan face depression positioned around a shaft aperture of the drive end fan, wherein the plurality of auxiliary air flow inlet apertures are positioned within the fan face depression.

* * * * *